No. 710,401.

E. V. BAILLARD.
TYPE WRITING MACHINE.
(Application filed Feb. 26, 1902.)

Patented Oct. 7, 1902.

(No Model.)

8 Sheets—Sheet 1.

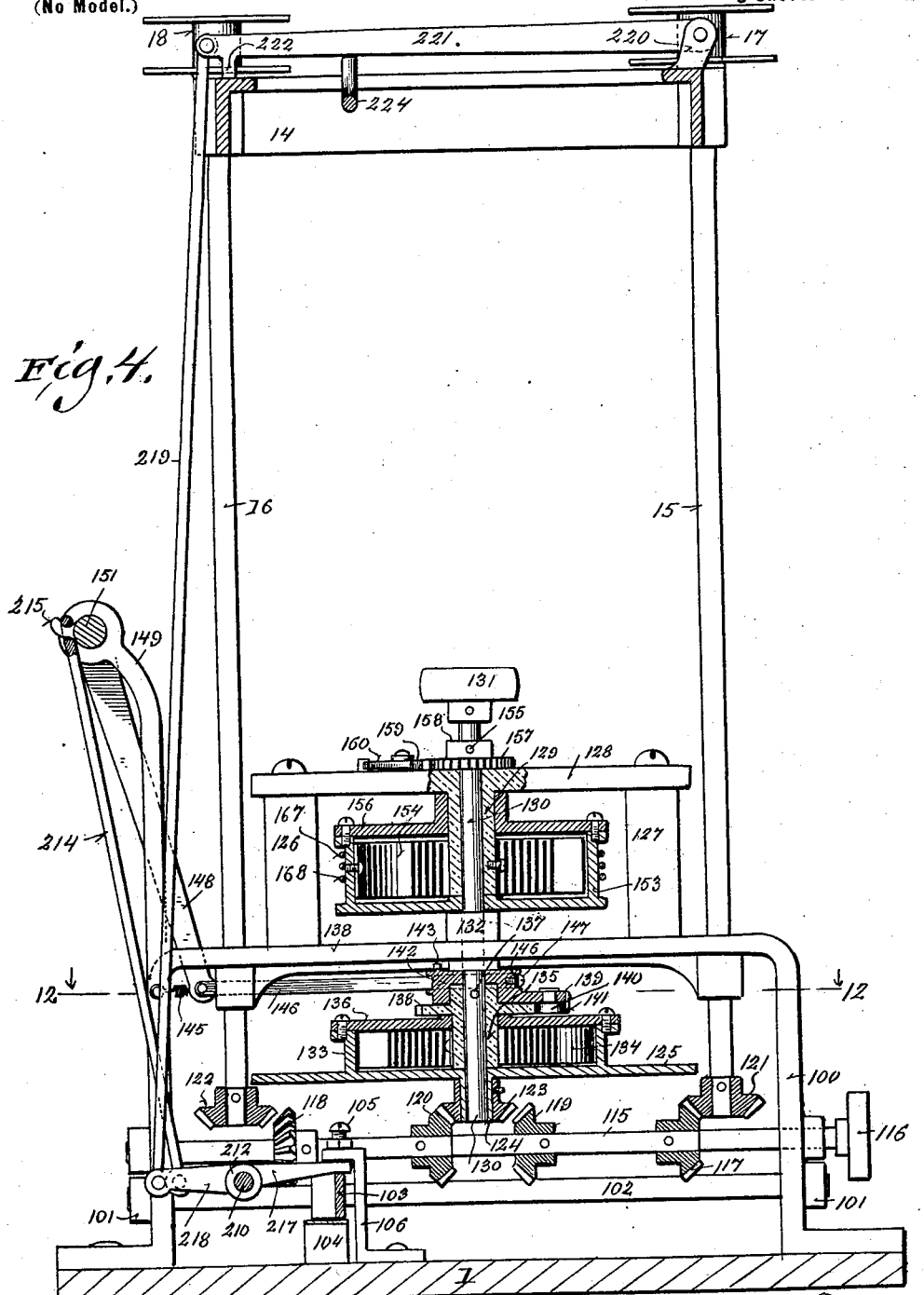

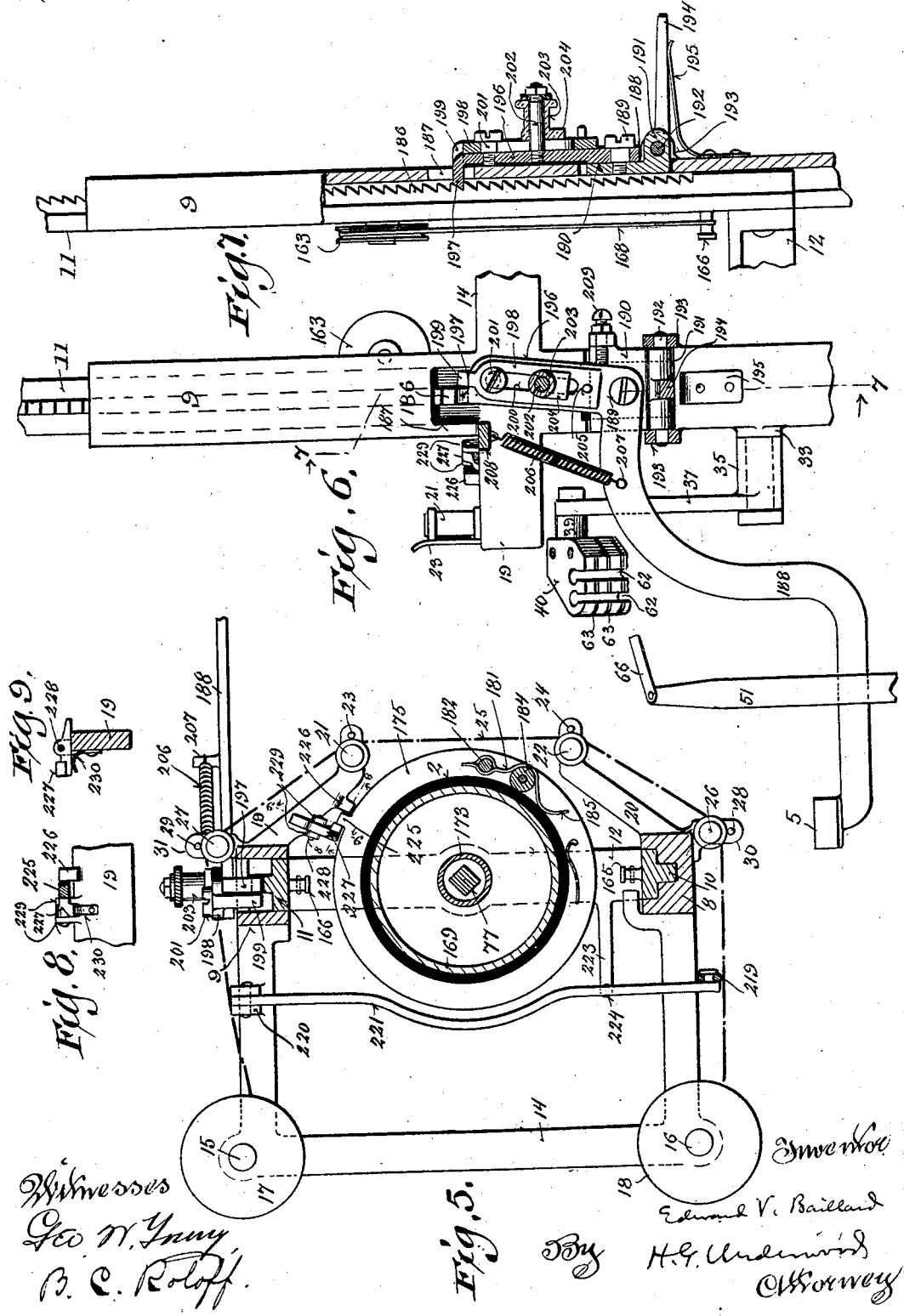

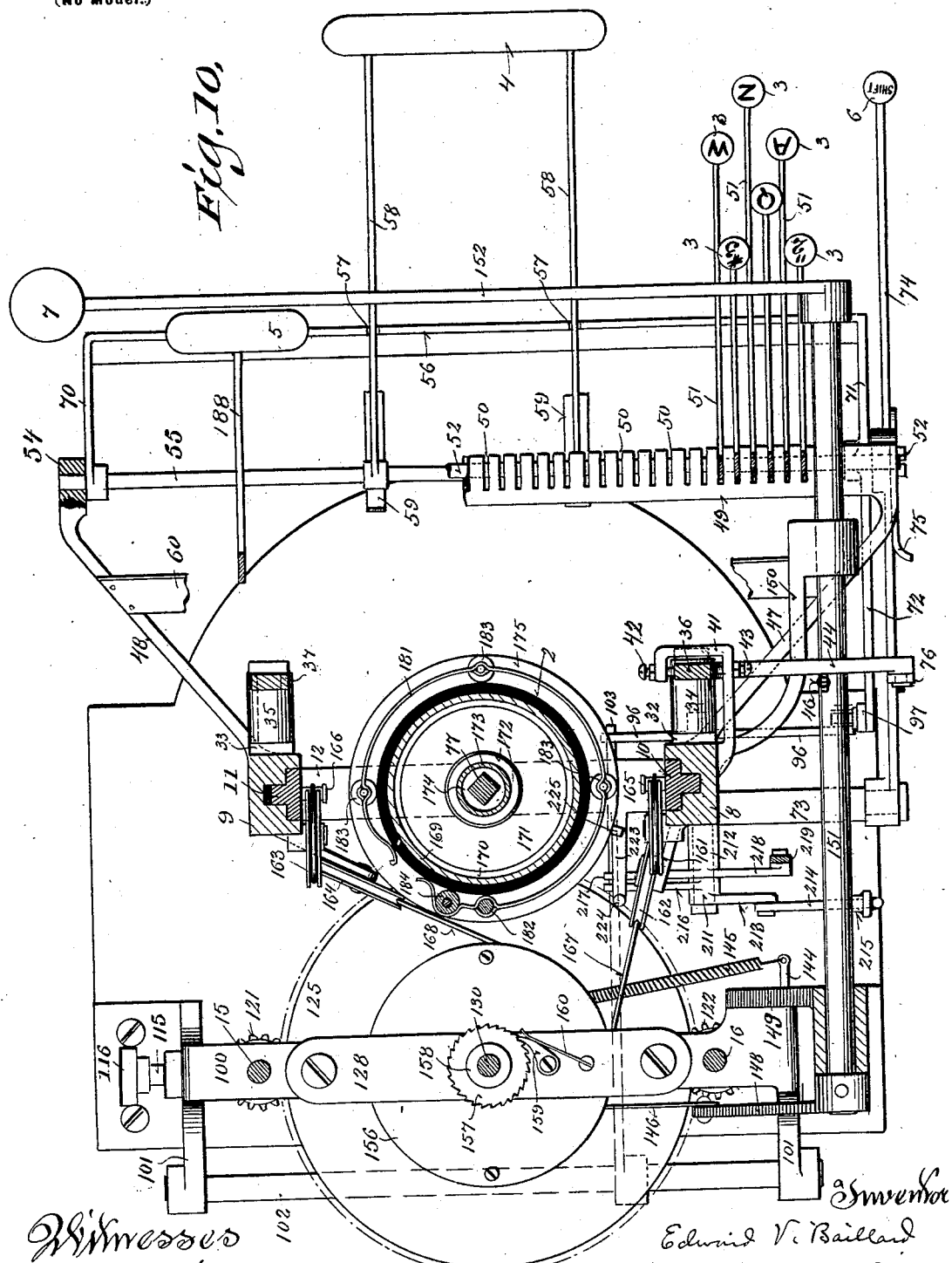

No. 710,401. Patented Oct. 7, 1902.
E. V. BAILLARD.
TYPE WRITING MACHINE.
(Application filed Feb. 26, 1902.)
(No Model.) 8 Sheets—Sheet 7.
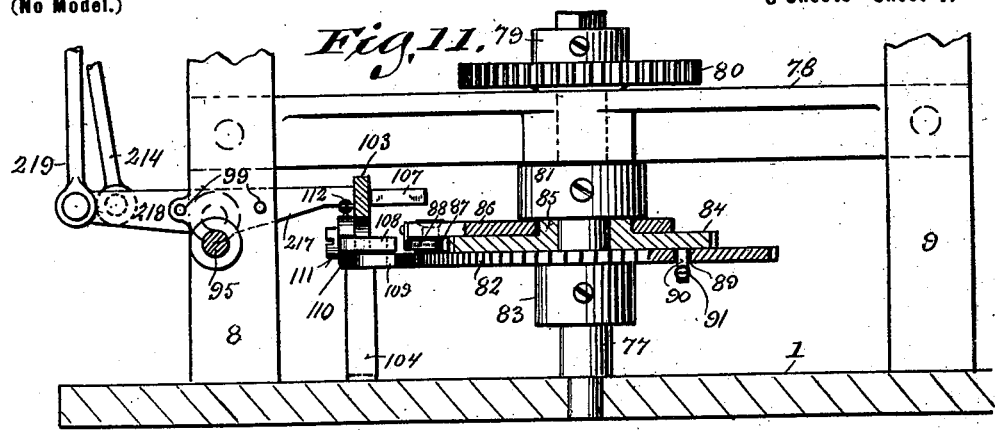
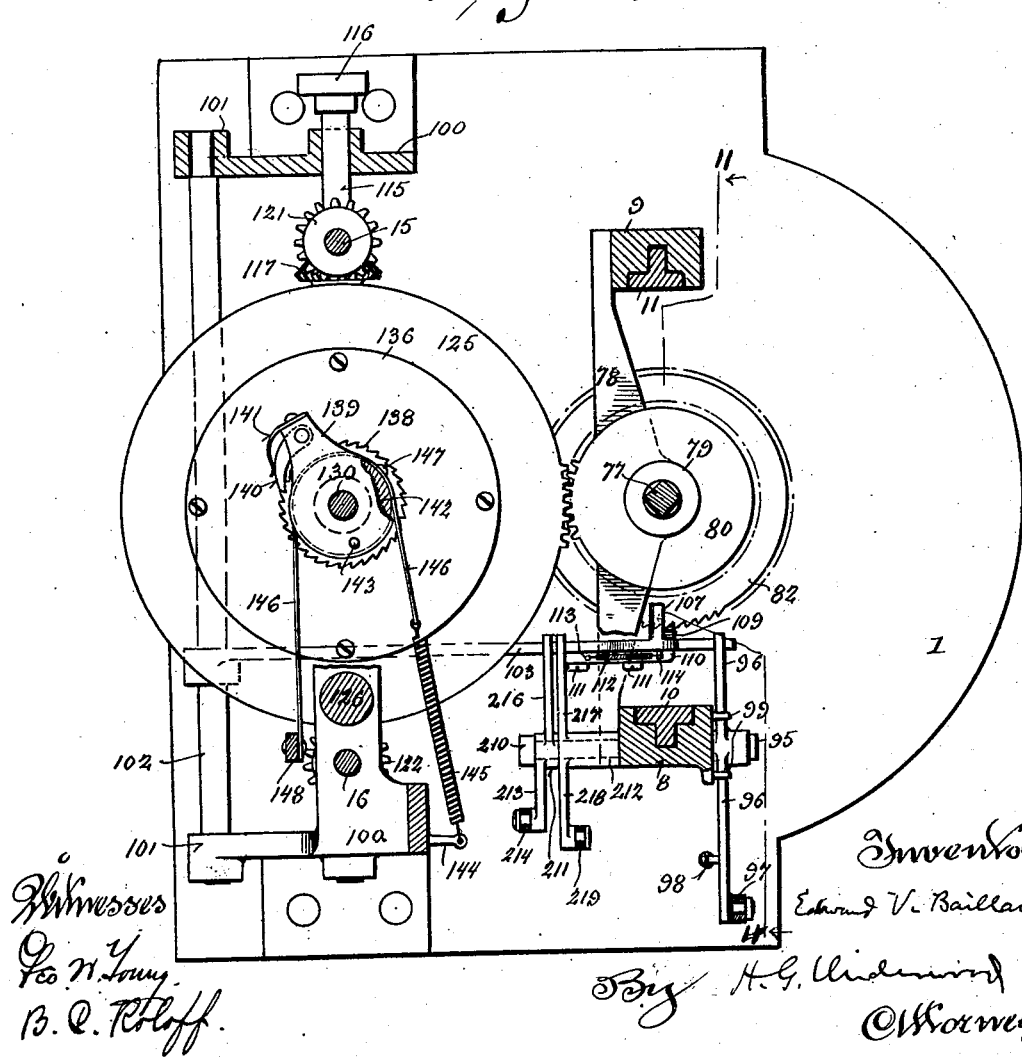
THE NORRIS PETERS CO., PHOTO-LITHO., WASHINGTON, D. C.

No. 710,401. Patented Oct. 7, 1902.
E. V. BAILLARD.
TYPE WRITING MACHINE.
(Application filed Feb. 26, 1902.)
(No Model.) 8 Sheets—Sheet 8.

Witnesses
Geo. W. Tracy.
B. C. Roloff.

Inventor
Edward V. Baillard
By H. G. Underwood
Attorney

UNITED STATES PATENT OFFICE.

EDWARD VICTOR BAILLARD, OF BROOKLYN, NEW YORK, ASSIGNOR TO OLE H. LEE AND ANTONIA HANSON, OF MILWAUKEE, WISCONSIN.

TYPE-WRITING MACHINE.

SPECIFICATION forming part of Letters Patent No. 710,401, dated October 7, 1902.

Application filed February 26, 1902. Serial No. 95,765. (No model.)

*To all whom it may concern:*

Be it known that I, EDWARD VICTOR BAILLARD, a citizen of the United States, and a resident of New York, borough of Brooklyn, in the county of Kings and State of New York, have invented certain new and useful Improvements in Type-Writing Machines; and I do hereby declare that the following is a full, clear, and exact description thereof.

My invention relates to that class of type-writing machines which employ keyboards, type-bars connected to the key-levers, and ribbons for the type-bars to strike against, the platen in my device being arranged vertically, as in the machine covered by Letters Patent No. 624,929, dated May 16, 1899, on which my present invention is an improvement; and it consists in certain peculiarities of construction and combination of parts, as will be fully set forth hereinafter in connection with the accompanying drawings, and subsequently claimed.

Figure 1:
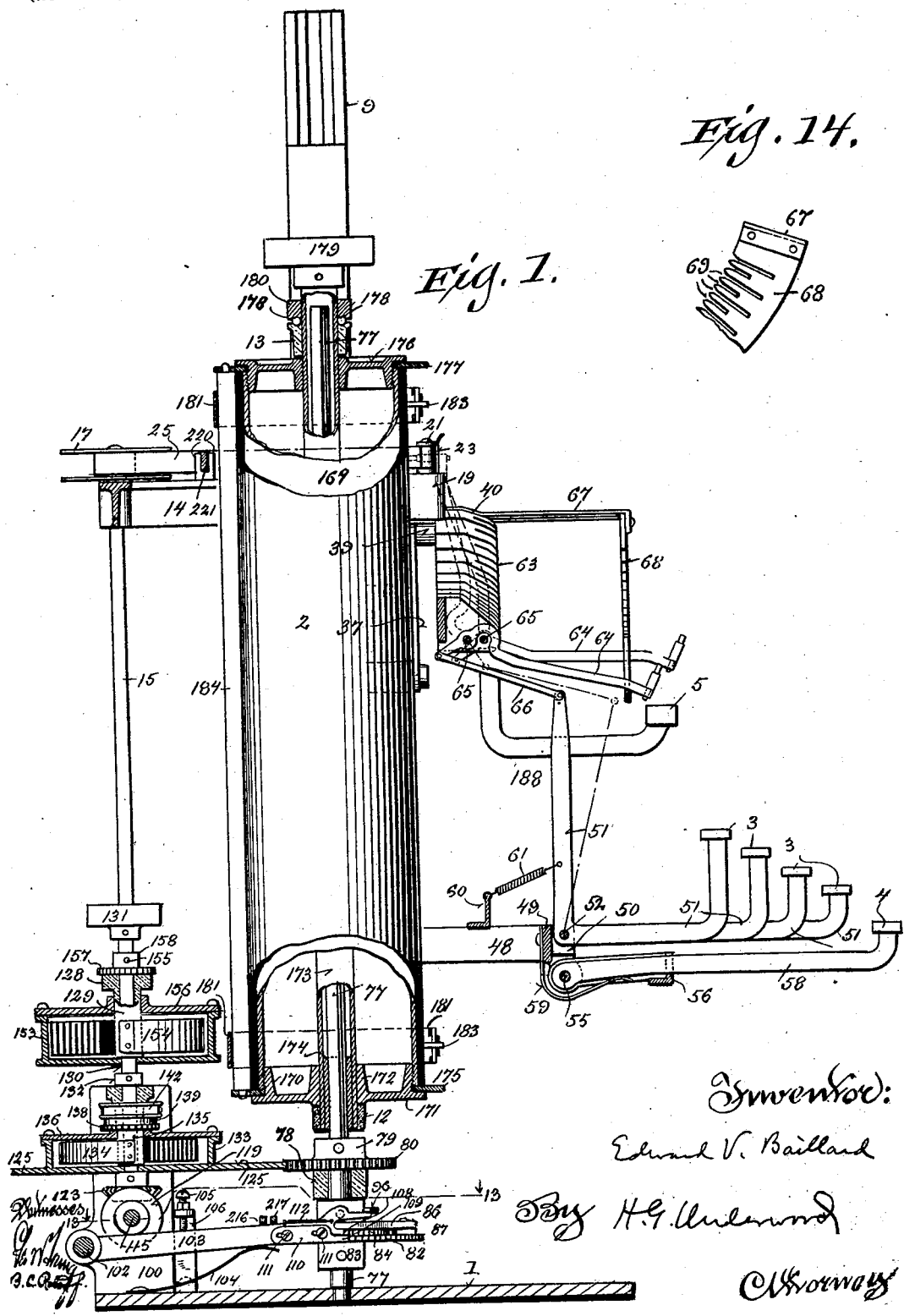
Figure 2:
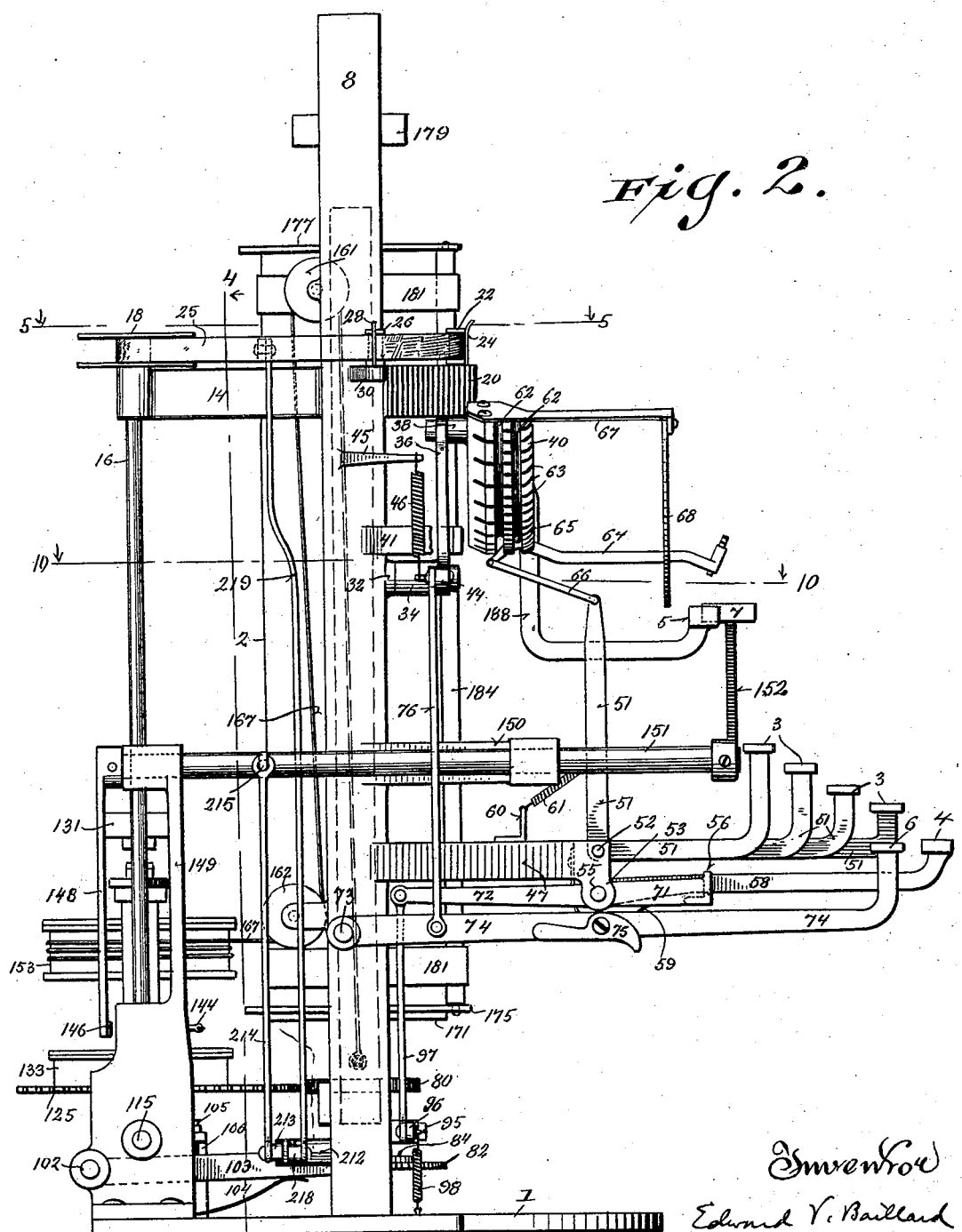
Figure 3:
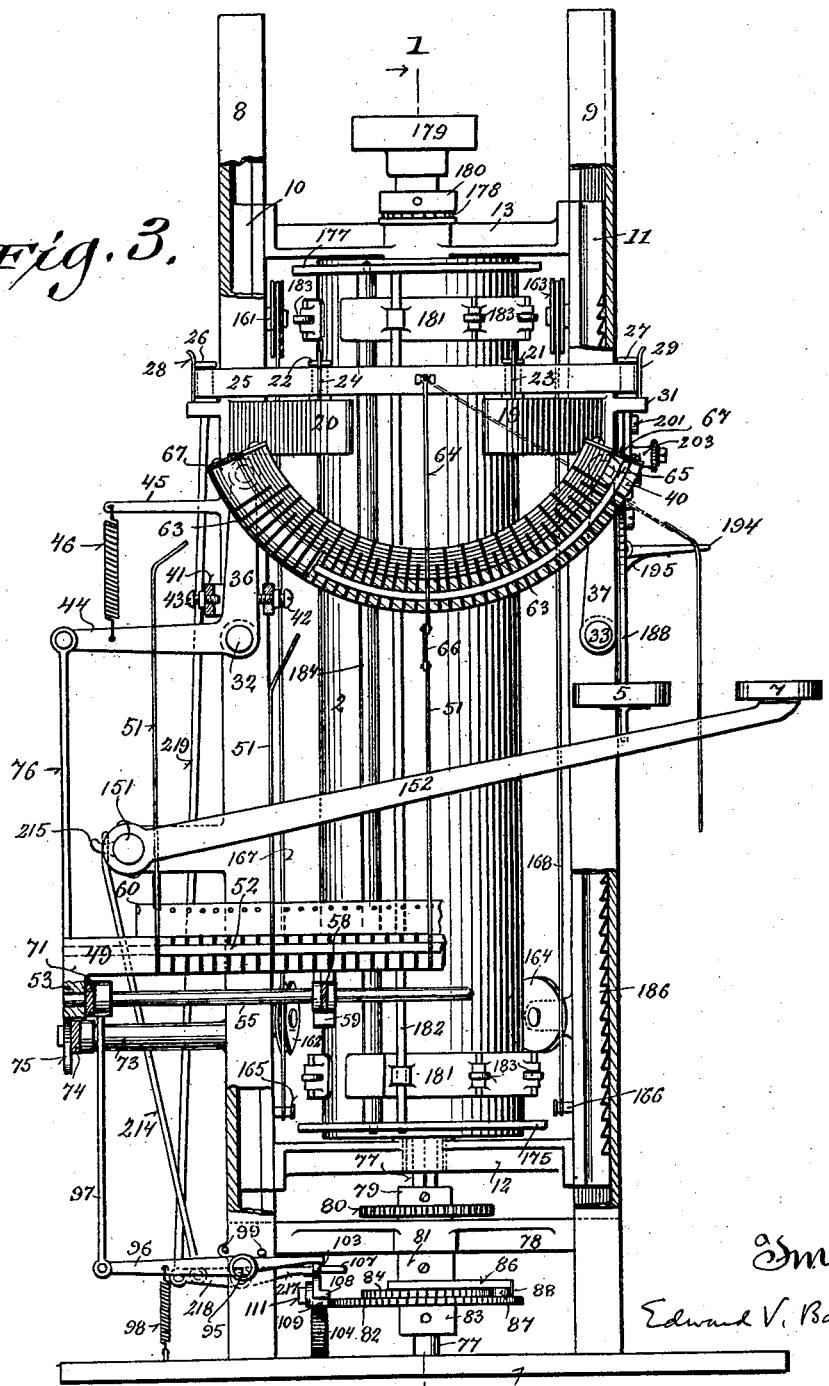
Figure 13:
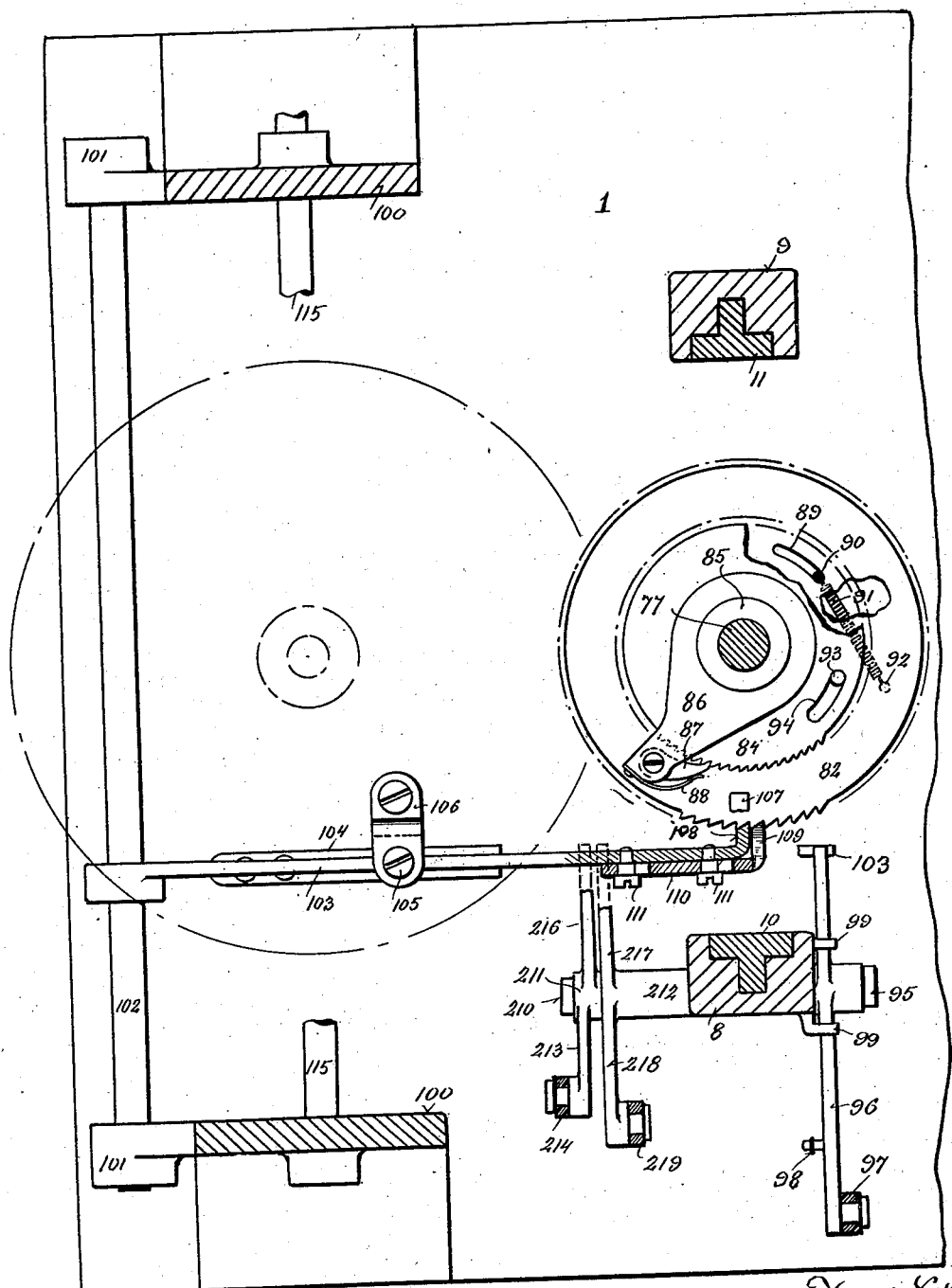

In the said drawings, Figure 1 is a vertical sectional view of the said machine, taken on the plane indicated by the line 1 1 in Fig. 3. Fig. 2 is a side elevation. Fig. 3 is a front elevation partly broken away to better illustrate certain details of construction and the keys, key-levers, and adjacent parts being omitted in this view. Fig. 4 is a vertical sectional view of the rear portion of the machine, taken on the plane indicated by the line 4 4 in Fig. 2. Fig. 5 is a horizontal sectional view of the upper part of the machine, taken on the plane indicated by the line 5 5 in Fig. 2. Fig. 6 is a detail view of the line-spacing mechanism drawn to an enlarged scale. Fig. 7 is another detail view of the same, partly in section, on the line 7 7 in Fig. 6. Figs. 8 and 9 are detail views of the stops for holding the platen-supporting slide in its highest raised position, said views being taken, respectively, on the lines 8 8 and 9 9 in Fig. 5. Fig. 10 is a broken plan view of the lower part of the machine, partly in section, on the plane indicated by the line 10 10 in Fig. 2. Fig. 11 is a detail vertical sectional view of part of the lower portion of the machine, taken on the plane indicated by the line 11 11 in Fig. 12. Fig. 12 is a horizontal sectional view of said lower part of the machine, taken on the plane indicated by the line 12 12 in Fig. 4. Fig. 13 is a detail sectional view of part of the lower portion of said machine, taken on the plane indicated by the line 13 13 in Fig. 1 and drawn to an enlarged scale. Fig. 14 is a detail view of a portion of the type-bar-supporting comb.

Referring by numerals to the said drawings, 1 designates the base of the machine; 2, the vertically-disposed platen; 3 3 3, the type-keys; 4, the spacer-bar; 5, the platen-raising or line key; 6, the shift-key, and 7 the margin-key, the said keys and their attachments being hereinafter more fully explained. Rising from the base 1 are two guide-posts 8 9, each formed on its inner side with a vertical T-shaped groove for the reception of the correspondingly-shaped side bars 10 11 of the platen-supporting slide, said side bars being united at their base by a cross-bar 12 and at their top by another cross-bar 13. The guide-posts 8 9 are connected by a rearward-extending yoke-shaped cross-piece 14, the rear corners of which are bored for the reception of the vertical shafts 15 16 of the ribbon-spools 17 18, while in horizontal line with said cross-bar 14 are the forward-projecting ribbon-supporting arms 19 20, extending in front of the platen 2 and having guide-spools 21 22 and guide-pins 23 24, between which the vertically-disposed ribbon 25 travels, there being similar guide-spools 26 27 and guide-pins 28 29, supported by projections 30 31, extending from the guide-posts 8 9, for the support and guidance of said ribbon at each side of the machine.

Projecting horizontally from the front faces of the guide-posts 8 9 are studs 32 33, on which are mounted sleeves 34 35, having upward-extending lever-arms 36 37 rigidly secured thereto, and the upper ends of said lever-arms are bored for the reception of the inner ends of studs 38 39, projecting horizontally backward from an arc-shaped guide 40, hereinafter more particularly described. Projecting forwardly from the guide-post 8, just above the plane of the stud 32, is an angled-shaped stop-lug 41, with two opposed set-screws 42 43, projecting therethrough in line with the opposed edges of the described lever-arm 36, and from the lower end of this arm 36 there extends outwardly a horizontal lever-arm 44, and above the plane of the last-named arm is a forwardly-projecting lug 45, projecting from the guide-post 8 and connected to the said arm 44 by a retracting-spring 46. Projecting forwardly and outwardly from the guide-posts 8 9 at a plane below the just-described parts are two rigid arms 47 48, which support between their forward ends the longitudinally bored or slotted bar 49, formed with transverse kerfs 50 50 down through its forward edge, intercepting the said longitudinal bore or slot, the said kerfs being for the reception of the inner angles of the angular levers 51 51 of the type-keys 3 3, said levers being perforated through the described angles and held to place within the said bar 49 by a retaining-rod 52. From the under side of the front ends of the arms 47 48 or the adjacent ends of the bar 49 there depend lugs or projections 53 54, forming bearings in which are journaled the ends of a transverse shaft 55, to which are rigidly secured the side arms 70 71 of a yoke-frame, whose front transverse arm 56 is recessed in its upper face, as shown at 57 57, for the reception of the spacer-bar levers 58 58, supported by said yoke-frame, the inner ends of said levers 58 being rigidly secured to the shaft 55 and the side arm 71 of the said yoke-frame projecting back of said shaft, forming the lever 72. Bent leaf-springs 59 59 are secured to the back of the bar 49 and curved under the same and forwardly, so as to support the inner ends of the spacer-bar levers 58 58. A transverse angle-plate 60 extends across between the arms 47 48 and is rigidly secured thereto back of the bar 49, and from the vertical flange of this angle-plate retracting-springs 61 extend to the upright arms of the type-key levers 51. The described yoke-frame and its attachments are operated by the depression of the key-levers 51 and space-bar levers 58 in the regular manipulation of the keyboard. The hereinbefore-named arc-shaped guide 40 is formed with longitudinal grooves 62 62 in its under side and with transverse kerfs 63 63 communicating with said grooves, and the perforated inner ends of the type-bars 64 64 are seated within said kerfs and kept in place by the curved rods 65 65, on which the said type-bars are threaded, the rods 65 being held within the grooves 62, with the type-bars 64 supported therein, the extreme inner ends of the said type-bars being connected by links 66 to the upper ends of the upright arms of the type-key levers 51. To the upper ends of the guide 40 there are secured forwardly-projecting plates 67 67, and to the front ends of said plates are secured the ends of an arc-shaped comb 68, the kerfs 69 69 of which serve to support the outer or free ends of the type-bars 64 64 when the latter are at rest.

Projecting laterally from the guide-post 8 at a plane below the arm 47 is a stud 73, on which is journaled the inner end of the lever 74 of the shift-key 6, said lever extending forwardly beneath the described lug or projection 53, and a cam 75 is pivoted to the lever 74 at this point, back of which the said lever is connected by a link 76 to the outer end of the lever-arm 44 above. Each type-bar 64 carries two characters on the printing end, as is common in shift type-writers; but in this machine instead of moving the platen when it is desired to shift from one character to the other on the same type-bar the shift-key 6 is depressed, which draws down on the said lever-arm 44, and this by the action of the lever-arms 36 37 swings the arc-shaped guide 40 bodily over to one side, carrying with it all the type-bars and levers thereto attached and by the changed position of the kerfs on the said guide 40 presents to the ribbon the opposite character on the type-bar when the type-key connected thereto is depressed to the character on said type-bar which would strike if the arc-shaped guide 40 had not been thus shifted, and if it is desired to continuously strike with the shifted charters the cam 75 is turned up against the under side of the described lug or projection 53.

77 designates a vertical shaft stepped in the base 1, the lower part of said shaft being cylindrical and the balance square or polygonal faced in cross-section, said shaft passing through a vertical perforation in the cross-bar 78, which is rigidly secured to the guide-posts 8 9. Above this cross-bar the hub 79 of a gear-wheel 80 is made fast to the said shaft 77, and below said cross-bar 78 the said shaft carries a collar 81 and some distance below this a ratchet-wheel 82, whose hub 83 is made fast to the shaft 77. A smaller ratchet-wheel 84, loose on the shaft 77, rests on the said ratchet-wheel 82, the hub 85 of the wheel 84 rising to the base of the collar 81, and surrounding this hub 85 is a plate 86, whose free end projects beyond the periphery of the ratchet-wheel 84 and carries a pivoted dog 87 for engagement with the teeth of said ratchet-wheel 84, the dog being held against the teeth by a spring 88. The ratchet-wheel 82 is formed with an arc slot 89 therethrough, and a pin 90 projects from the under side of the ratchet-wheel 84 down through this slot 89. A spring 91 connects this pin 90 with a pin 92, depending from the under side of the ratchet-wheel 82, as indicated in Fig. 13. The ratchet-wheel 82 is further provided with an upward-extending pin 93 on its upper surface, which last-named pin projects up through an arc slot 94 in the upper ratchet-wheel 84.

Projecting forwardly from the lower part of the guide-post 8 is a stud 95, on which is mounted the rocking lever 96, whose ends project on each side of said guide-post, the outer end of said lever being pivotally connected by a vertical link 97 with the rear end of the hereinbefore-named lever 72, which formed the backward-projecting continuation of the side arm 71 of the yoke-frame beneath the spacer-bar levers 58 58, and adjacent to said link 97 the said end of the rocking lever 96 is connected to the base 1 by a spring 98. Above the lever 96 and on each side of the stud 95 there project from the guide-post 8 the stop-pins 99 99 to limit the upward motion of said lever.

At the rear of the machine a transversely-arranged arch-shaped frame 100 rises from the base 1, and from the vertical side pieces of said frame there extend bearings 101 101 for a transverse rock-shaft 102, to which shaft is secured a forwardly-projecting lever 103. This lever is supported from beneath by a leaf-spring 104, and its upward movement is limited by an adjustable screw-stop 105, working in a standard 106. The forward end of this lever 103 is just beneath and in engagement with the inner end of the described rocking lever 96, and back of this point the said lever 103 is provided with a laterally-projecting pin 107, which extends over the described ratchet-wheel 82. Beneath and in line with pin 107 the lever 103 has an inwardly-bent portion forming a stationary dog 108 for engagement with the teeth of the ratchet-wheel 82 when the lever 103 is depressed by the action of the type-key or spacer-bar levers, the said ratchet-wheel teeth being normally in engagement with another dog 109 on the end of a slotted sliding bar 110, which last-named dog is then immediately beneath dog 108. The bar 110 is held to lever 103 by the headed screws or rivets 111 111, whose shanks pass through the slots in the said bar, and when the lever 103 is depressed, so that the dog 109 is freed from engagement with the teeth on ratchet-wheel 82, the sliding bar 110 is pulled forward by spring 112, one end of which is secured to a pin 113 on the sliding bar and the other end to a pin 114 on the lever 103, so that as the lever 103 is raised by its spring 104 when pressure on the said lever is released the dog 109 will engage with the next forward tooth of the ratchet-wheel 82.

Journaled in the side pieces of the frame 100 is a transversely-arranged longitudinally-movable shaft 115, having a head 116 at one end to facilitate its adjustment, and fast on said shaft are two outer miter-wheels 117 118 and two inner miter-wheels 119 120, the wheel 117 being for engagement with a horizontal miter-wheel fast on the lower end of the vertical ribbon-spool shaft 15 and the wheel 118 for engagement (when the shaft 115 is pushed in) with the miter-wheel 122 on the lower end of the other vertical ribbon-spool shaft 16, the said vertical shafts passing through vertical bores in the said frame 100 and one or the other of the inner miter-wheels 119 120 being always in engagement with the horizontal miter-wheel 123, fast on the depending hub 124 of the large ratchet-wheel 125, which is in mesh with the hereinbefore-named ratchet-wheel 80.

Rising from the upper cross-piece of the described arch-shaped frame 100 are two posts 126 127, united by a cross-bar 128, formed with a central depending sleeve 129, and journaled in said sleeve is a vertical shaft 130, which passes down through the cross-piece of the frame 100 and through the ratchet-wheel 125 and its hub, turning loosely in the latter, the upper projecting end of said shaft 130 terminating in a hand-wheel 131 and said shaft carrying a collar 132, which rests on the cross-piece of frame 100. The ratchet-wheel 125 is formed with a drum or housing 133, which contains a volute spring 134, one end of which is attached to the inner surface of the wall of said drum, and the other end of said spring is secured to a sleeve 135. The said drum 133 has a cover 136 screwed thereto, and the sleeve 135 (which surrounds shaft 130 and is made fast thereto, as by pin 137) passes up through the drum-cover 136, and just above this point the said sleeve is formed or fitted with a ratchet-wheel 138, the hub of which ratchet-wheel is surrounded by a plate 139, carrying a pivoted dog 140, held against the teeth of the ratchet-wheel 138 by a spring 141, the upper part of the said plate 139 being formed into a grooved pulley 142, having an upward-projecting stop-pin 143. An arm 144 projects forwardly from the arch-shaped frame 100, and a spiral spring 145 is connected at one end to this arm 144 and at its other end to a metal strap 146, which passes around the groove in the said pulley 142 (to which it is secured by screw 147) back toward the side of the machine, the other end of said strap being attached to the lower end of an inclined lever 148, presently described. Rising from the arch-shaped frame 100 adjacent to the arm 144 is a standard 149, and projecting from the guide-post 8 is an arm 150, and bearings are formed in these parts 149 150 for a rock-shaft 151, to the rear end of which rock-shaft the upper end of the said lever 148 is made fast, while to the forward end of said shaft is rigidly secured the end of the lever 152 of the margin-key 7.

Surrounding the vertical shaft 130 above the drum 133 is another drum or casing 153, which contains a volute spring 154, wound in the reverse direction from the lower volute spring 134, one end of the upper spring 154 being secured to the inner surface of the cylindrical wall of its drum 153 and the other end to the sleeve 129, which projects down into said drum, the latter, however, being free from connection with either said sleeve or the shaft 130. This upper drum has a cover 156 screwed thereto, and the said sleeve 129 passes down through the drum-cover. Just above the described cross-bar 128 the shaft 130 has a ratchet-wheel 157, made fast thereto by a pin 155 through its hub 158, and said cross-bar 128 carries a pivoted dog 159, held against the teeth of said ratchet-wheel by spring 160.

On suitable lugs projecting from the guide-post 8 are upper and lower grooved pulleys 161 162, and on similar lugs projecting from the guide-post 9 are also like upper and lower grooved pulleys 163 164, and on the side bars 10 11, which slide in said guide-posts, are pins 165 166. From the pin 165 a cord 167 extends up and over pulley 161 and then down and under pulley 162 and to the upper drum 153, to whose outer cylindrical face the other end of this cord is secured. Similarly another cord 168 extends from the pin 166 up and over pulley 163 and then down and under pulley 164 and to the said drum 153, this cord being similarly secured to said drum, all for a purpose to be presently described.

The vertical platen 2 is formed of india-rubber mounted on a hollow metal cylinder 169, whose lower end is formed with interior screw-threads for engagement with the exterior screw-threads on the annular vertical flange 170 of a circular base-piece 171, which latter has a central hub 172, brazed to a vertical cylindrical tube 173, which projects a slight distance below the bottom plane of the base-piece 171 and turns in a circular bore in the lower cross-bar 12, which unites the side bars 10 11 of the platen-supporting slide, while within the lower end of the said cylindrical tube 173 there is brazed a bushing 174, having a vertical polygonal-walled bore therethrough fitting snugly upon the hereinbefore-named polygonal-faced vertical shaft 77, which extends up within the said tube 173 to near the upper end thereof. The base-piece 171 serves to support a flat ring 175, which surrounds the said flange 170 and is clamped between the outer circumferential portion of said base-piece and the lower ends of the platen 2 and its supporting-cylinder 169. At the upper end of the platen there is a cap-piece 176, which is the counterpart of the said base-piece 171, applied in the reverse position, said cap-piece having a vertical annular exteriorly-threaded flange engaging with interior screw-threads in the upper end of the platen-supporting cylinder 169 and a central hub brazed to the tube 173 and there being a flat ring 177 surrounding the annular flange of the cap-piece, said ring resting on the upper ends of the platen and its supporting-cylinder and being clamped between said upper ends and the outer circumferential portion of the said cap-piece. The tube 173 extends up through a circular bore in the upper cross-bar 13 of the platen-supporting slide side bars, and this upper cross-bar is formed with an annular groove in its upper surface for the reception of antifriction-balls 178. The said tube 173 terminates in a convenient hand-wheel 179, and below this is fitted with a collar 180, whose under surface is formed with an annular groove fitting over the said balls 178, so that the said tube may be rotatively moved with a minimum amount of friction when it is desired to turn the platen by hand, as in putting a sheet of paper on the platen or removing one therefrom.

As in the prior patent, No. 624,929, on which this is an improvement, the sheet of paper to be type-written upon is wrapped around the platen and held in place by open annular paper-clamps 181 181, consisting of flat metallic spring-bands open at one point, said bands being supported on a vertical rod 182, which extends between the described lower and upper flat rings 175 177 and said bands 181 181, carrying at intervals rollers 183 183, preferably of india-rubber or analogous material, whose edges bear transversely against the said sheet of paper, while adjacent to one open end of said bands the same are curved over to afford room for a vertical rubber roller 184, whose ends are journaled in the said flat rings 175 177 and which serves as a feed-roller for the paper, the adjacent ends of the bands 181 being curved outwardly, as shown at 185, all substantially as shown and described in the said prior patent.

The side bar 11 of the platen-supporting slide, which moves in the guide-post 9, is formed with a vertical series of ratchet-teeth, as shown at 186, and the outer side face of the said guide-post is formed with a slot 187 therethrough for the admission of the dogs which engage with said teeth. The platen-raising or line key 5 has a bent lever 188, pivotally connected by bolt or screw 189 to the vertical flange 190 of an angle-plate whose horizontal portion 191 is mounted on a journal 192, which has its bearings in lugs 193 193 on said guide-post 9. An arm 194 projects laterally from the part 191 of the said angle-plate, and a bent leaf-spring 195, secured to the post 9, bears up against this arm, and thus serves to keep the vertical flange 190 of said angle-plate normally against the guide-post 9. Above the pivotal point 189 the lever 188 is continued vertically, forming a lever-arm 196, whose upper end terminates in an inward-projecting dog 197, normally in engagement with said teeth 186 of the side bar 11, and said lever-arm 196 carries a sliding plate 198, whose upper end terminates in another inward-projecting dog 199 for engagement with said teeth 186 when the lever 188 is shifted by depression of the key 5. This plate 198 has a longitudinal slot 200 therethrough and is kept in place on the lever-arm 196 by screws 201 202, whose shanks pass through said slot. The head of the screw 201 fits over the side walls of the slot 200; but the shank of screw 202 is much longer and carries thereon a sleeve 203, having a lug 204 at its inner end, the said sleeve being held loosely enough against the sliding plate by nuts on the outer end of the screw 202 to permit vertical movement of said plate and yet with sufficient friction to enable the sleeve when turned one-quarter around to remain in that position with the lug 204 pointing forwardly instead of downwardly, as shown in Fig. 6, to increase the distance to which said sliding plate can be moved upward before the stop-pin 205 thereon comes in contact with the inner end of the said sleeve, so as to raise the platen 2 either a single or a double linespace, as desired, the raising of the platen being accomplished by the described cords 167 168, secured to the described upper drum 153, revolved by its volute spring 154, and the described elevation being limited in extent by the action of the dogs of the line-spacing mechanism just described. The line-key lever 188 is automatically retracted to its normal position after each depression of the key 5 by means of the spring 206, extending between a pin 207 on said lever and a stop-lug 208 on the guide-post 9, this stop-lug serving to limit the forward movement of the lever-arm 196, and consequently the depression of said lever 188, of which said arm forms a rigid part, the backward movement of the said lever-arm being limited by an adjustable screw-stop 209, working through a lug on the guide-post 9. When it is desired to raise the platen its full height, it is only necessary to depress the described arm 194, which rocks the angle-plate of which said arm is a part on its journal 192, and the vertical flange 190 of said angle-plate will force the lever-arm 196 outward, and thus draw the dogs carried thereby away from the line of the teeth 186 of the sliding side bar 11, and then the described action of the volute spring 154 and its drum and the cords 167 168, connected thereto, will at once raise the platen to its limit.

Projecting rearwardly from the guide-post 8 is a stud 210, on which are mounted two sleeves 211 212, having lever-arms projecting transversely therefrom in opposite directions. The outer lever-arm 213 of the outer sleeve 211 is pivotally connected to a link 214, whose upper end is connected to a pin 215 on the rock-shaft 151 of the margin-key mechanism, and the inner lever-arm 216 of said sleeve projects over and rests on the hereinbefore-named lever 103, as does the inner lever-arm 217 of the inner sleeve 212, while the outer lever-arm 218 of said inner sleeve is pivotally connected to the lower end of a vertical rod 219, which extends up above the plane of the yoke-shaped cross-piece 14, which supports the ribbon-spools. Pivoted to a bearing 220 on the arm of said cross-piece 14, which projects back from the guide-post 9, is a transverse cross-bar 221, whose other end is pivotally secured to the upper end of the said vertical rod 219, the cross-bar 221 having adjacent to this end a downward-projecting lug 222, which normally rests on the arm of the cross-piece 14, which projects back from the guide-post 8.

Projecting rearwardly from the lower cross-bar 12 of the platen-supporting slide side bars is an arm 223, terminating in an upward-extending finger 224, which latter when the platen is raised to its full limit comes against the cross-bar 221 and raises it, and thereby, through the rod 219, raises the lever-arm 218 and depresses the lever-arm 217, which latter in turn depresses the forward end of the lever 103, thus forcing the dogs 108 109 below the plane of the ratchet-wheel 82, and the moment these dogs are freed from engagement with the teeth of said ratchet-wheel 82 the volute spring 134 in the lower drum 133 revolves said drum and the large ratchet-wheel 125, rigid with the drum 133, thereby revolving the ratchet-wheel 80, with which said wheel 125 is in mesh, and thus revolving ratchet-wheel 82 until the outer end of plate 86 on said ratchet-wheel 82 is stopped by contact with the described pin 107, projecting from the lever 103, this described revolution of the several ratchet-wheels serving also to revolve the vertical shaft 77 and with the same to revolve the platen 2, the plate 86 having been previously adjusted to the proper point to determine the width of the margin desired at the left hand of the paper on said platen. The described revolution of the platen is automatic when the said platen has been raised its full limit; but if at any time (as when a full line has been type-written) it is desired to revolve the platen, so that the paper thereon shall be in position to start a fresh line at the left-hand margin, then the margin-key 7 is depressed and with it the lever 152, and this rocks the rock-shaft 151 and draws up on the link 214 and lever-arm 213, which depresses the lever-arm 216 and with it the said lever 103, when the dogs 108 109 will be freed from the teeth of the ratchet-wheel 82, and precisely the same action will take place, as just described, when said lever 103 was depressed by the upward action of the rod 219, and the platen will swing around, and then said platen is raised one line by depressing the line-key 5, and the paper on the platen is in proper position for type-writing the next line.

The object of raising the platen to its full height is to have same in proper position to remove a sheet of paper therefrom or place a fresh sheet thereon, and when the platen is thus raised (which can be quickly done by depressing the arm 194, and thus freeing the dogs 197 199 from engagement with the teeth 186 of the platen-raising slide side bar 11) the said platen will whirl around until a pin 225, projecting from the periphery of the lower flat ring 175, is stopped by a stop-lug 226, projecting toward said platen from the ribbon-supporting arm 19. As the elevated platen is swung around by the described action of the volute spring 134 and the ratchet-plates and attachments, the said pin 225 first passes over and depresses a pivoted lug 227, journaled on pivot 228 between ears 229 229 on said arm 19, and then as the pin 225 passes over lug 227 and comes against the stationary stop-lug 226 the lug 227 is raised by spring 230, mounted on the arm 19, and the pin 225 is caught and held between the lugs 226 227, which keeps the upper and lower flat rings 175 177 (which are connected by the rod 182) from revolving during the adjustment of the paper. If a sheet is to be removed, it can then be very readily pulled out; but if a fresh sheet is to be put upon the platen the right vertical edge of the paper is placed against the platen beneath the outcurved ends 185 of the paper-clamp bands 181 181 and the platen turned by its hand-wheel 179, when the vertical roller 184 will at once feed the sheet of paper around the platen beneath the spring paper-clamp bands 181, and when the paper is thus properly adjusted the platen can be pushed down to place, and the machine is ready for writing upon the fresh sheet.

As heretofore stated, the width of the margin to be left at the left-hand edge of the sheet being type-written on is regulated by the adjustment of the plate 86, which is turned around on the ratchet-wheel 84 until the distance left between the free end of this plate and the line of the pin 107 on the lever 103 is equal to the width of the margin desired. When the lever 103 is depressed, as before described, to free the dogs 108 109 from engagement with the teeth of ratchet-wheel 82, so that the latter can revolve, the lateral pin 107 is down in the path of the end of the plate 86 to stop the same, it is of course desirable that said plate end should clear this point for the subsequent operation of the machine, and for this reason the slots and pins in the ratchet-wheels 82 84 and the spring 91 are provided, so that as soon as pressure on the margin-key is released the lever 103 will be forced upward by its spring 104, carrying the pin 107 on the end of the lever up with it away from the end of the plate 86, and then the spring 91 will draw on the pin 90 and turn the ratchet-wheel 84 around as far as the slots and pins in the ratchet-wheels 82 84 will permit, thus carrying the end of plate 86 beyond the line of the said pin 107, as shown in Fig. 13.

The volute spring 154 in the upper drum 153 is wound up every time the platen is pushed downward from its high position by reason of the revolution of the said drum 153, caused by the winding of the attached cords 167 168, and the volute spring 134 in the lower drum 133 is wound by the depression of the margin-key 7, as this action rocks the shaft 151, which draws the inclined lever 148 outwardly to a nearly-vertical position, pulling on the metal strap 146, which is rigidly secured to the grooved pulley 142, and causing the dog 140 to turn the ratchet-wheel 138, forming part of the sleeve 135, to which one end of said volute spring 134 is made fast, and thus said spring is wound up at the end of every finished line of type-writing, when the margin-key is depressed to revolve the platen for a new line, the retracting-spring 145, attached to the other end of the strap 146, serving to pull the dog 140 back to its former position and turning the grooved pulley 142 until its stop-pin 143 comes against the flange on the under side of the upper cross-piece of the arch-shaped frame 100.

Having thus described my invention, what I claim as new, and desire to secure by Letters Patent, is—

1. In a type-writing machine of the class described, the combination with the guide-posts, platen-supporting slide and vertically-arranged horizontally-revolving platen, of lever-arms pivotally secured to said guide-posts, and one of said lever-arms having a lower lateral extension; an arc-shaped guide connected to said lever-arms, and formed with radially-arranged transverse guide-kerfs; double-character type-bars pivotally secured to said guide, and having movement in said kerfs; type-keys having levers linked to said type-bars; and a shift-key having a lever linked to said lever-arm lateral extension, whereby, when said shift-key is depressed, the said guide is moved bodily past the platen.

2. In a type-writing machine of the class described, the combination with the guide-posts, platen-supporting slide and vertically-arranged horizontally-revolving platen, of an arc-shaped guide extending across from one guide-post to the other, and formed with radially-arranged transverse guide-kerfs; plates extending forwardly from the upper ends of said guide; an arc-shaped comb secured to the outer ends of said plates; type-bars pivotally secured to said guide and normally resting in said guide-kerfs and between the teeth of said comb; type-keys having rearwardly and upwardly bent levers; and links connecting the extreme ends of said levers to the pivoted ends of said type-bars.

3. In a type-writing machine of the class described, the combination with the guide-posts, platen-supporting slide and vertically-arranged horizontally-revolving platen, of lever-arms pivotally secured to said guide-posts, and one of said arms having a lower lateral extension; an arc-shaped guide connected to said lever-arms, and formed with radially-arranged transverse guide-kerfs; an arc-shaped type-bar-supporting comb secured to and in front of said guide; double-character type-bars pivotally secured to said guide, and normally resting and having movement in said kerfs and between the teeth of said comb; arms projecting rigidly from said guide-posts; a longitudinally-slotted and transversely-kerfed transverse bar supported by said arms; a shift-key having a lever pivotally secured to one of said guide-posts on a plane below said bar; a cam pivoted to said shift-key lever, below and in line with said bar; a link connecting said shift-key lever with the lever-arm lateral extension, and a retracting-spring, connecting the said extension with the adjacent guide-post; a rod in the longitudinal slot of the transverse bar; type-keys having rearwardly and upwardly bent levers pivoted on said rod and movable in the kerfs of said bar; retracting-springs secured to said type-key levers above their said pivotal points; and links connecting the extreme ends of said levers to the pivoted ends of said type-bars.

4. In a type-writing machine of the class described, the combination with a vertically-movable horizontally-revolving platen, of a margin-regulating key and independent spring mechanism for automatically revolving said platen without lateral or vertical change of position of said platen, and mechanism for automatically winding said independent spring mechanism at each depression of said key.

5. In a type-writing machine of the class described, the combination with a vertically-arranged horizontally-revolving platen, supported on a vertically-movable frame, and movably mounted on a vertical shaft, of upper and lower ratchet-wheels rigidly secured to said shaft; a lever, carrying a stationary dog and a movable dog, at its free end, for engagement with the teeth of the said lower ratchet-wheel; a spring bearing against said lever; a rocking lever mounted on the machine-frame, and having an inner arm projecting over the dog-carrying lever and an outer arm connected by a retracting-spring to the machine-base; a yoke-frame pivotally supported in front of the platen-frame and linked to the outer arm of said rocking lever; type-key and spacer-bar levers pivotally supported above said yoke-frame for engagement therewith on the depression of said keys and bar; type-bars, linked to said type-key levers, and arranged to present the type vertically to the platen; a ratchet-wheel at the rear of, and in mesh with, the upper ratchet-wheel on the vertical shaft, and a spring for revolving the said rear ratchet-wheel after the release of each tooth of the lower ratchet-wheel on said shaft in the operation of the said dogs.

6. In a type-writing machine of the class described, the combination with a vertically-arranged horizontally-revolving platen, supported on a vertically-movable frame, and movably mounted on a vertical shaft, of a line-key and connecting mechanism with a spring-drum mechanism for automatically raising said platen, without rotating the same, and an independent margin-regulating key with an independent spring-drum mechanism for automatically revolving said platen, without varying its elevation, the two movements of the platen being effected by the mere act of depression of the respective keys.

7. In a type-writing machine of the class described, the combination with independent springs for vertically moving and for horizontally revolving the platen respectively, of a margin-regulating key and connecting mechanism for automatically revolving said platen, without lateral or vertical change of position thereof, and automatically winding the spring mechanism for horizontal motion at each depression of said key, and an adjustable stop for limiting the said revolution of the platen to a predetermined distance.

8. In a type-writing machine of the class described, the combination with a vertically-movable horizontally-revolving platen, mounted on a vertical shaft, of upper and lower ratchet-wheels fast on said shaft, mechanism for revolving the lower ratchet-wheel on the platen-shaft, tooth by tooth; another vertical shaft back of said platen; a ratchet-wheel loose on said rear shaft in mesh with the upper wheel on the platen-shaft; a drum rigid with said loose rear ratchet-wheel; a sleeve fast on said rear shaft extending down within said drum; a ratchet-wheel rigid with said sleeve; a volute spring within said drum, having one end fast to the drum and the other end fast to said sleeve; a pulley journaled on said sleeve, and carrying a dog in engagement with the ratchet-wheel on the sleeve; a rock-shaft supported at one side of the machine; a margin-regulating key having its lever fast on one end of said rock-shaft; another lever fast on the other end of said rock-shaft; a strap secured to the other end of said last-named lever, and passing around and secured to the pulley above the drum; a retracting-spring secured to the other end of said strap, and link-and-lever mechanism connected to said rock-shaft for disengaging the tooth-operating mechanism from the platen-shaft, whereby the volute spring in the said drum is automatically wound up, each time the margin-regulating key is depressed to revolve the platen to its initial starting-point.

9. In a type-writing machine of the class described, the combination with a vertically-movable horizontally-revolving platen, mounted on a vertical shaft, of upper and lower ratchet-wheels rigidly secured to said shaft; a lever carrying a stationary dog and a movable dog, at its free end, for engagement with the teeth of the said lower ratchet-wheel; a spring bearing against said lever; a ratchet-wheel supported back of said platen and in engagement with the upper ratchet-wheel on the platen-shaft; a drum rigidly secured to said rear ratchet-wheel, and carrying a volute spring tending constantly to revolve said ratchet-wheel; a stud on the machine-frame, carrying a sleeve having two lever-arms, one projecting inwardly over the dog-carrying lever, and the other lever-arm projecting outwardly; a rock-shaft supported at one side of the machine; a margin-regulating key having a lever fast on one end of said rock-shaft; a lever fast on the other end of said rock-shaft and flexibly connected to said drum; and a link pivotally connecting said rock-shaft to the outer lever-arm on said sleeve.

10. In a type-writing machine of the type described, the combination with guide-posts united by an upper horizontal yoke-shaped cross-piece, and a vertically-arranged horizontally-revolving platen, supported on a frame having upper and lower cross-bars and side bars vertically movable in said guide-posts, and mounted on a vertical shaft, of upper and lower ratchet-wheels rigidly secured to said shaft; a lever carrying a stationary dog and a movable dog, at its free end, for engagement with the teeth of the said lower ratchet-wheel; a spring bearing against said lever; a ratchet-wheel supported back of said platen and in engagement with the upper ratchet-wheel on the platen-shaft; a drum rigidly secured to said rear ratchet-wheel, and carrying a volute spring tending constantly to revolve said ratchet-wheel; a stud on the machine-frame, carrying a sleeve having two lever-arms, one projecting inwardly over the dog-carrying lever, and the other lever-arm projecting outwardly; a transverse cross-bar pivotally secured to one arm of the said yoke-shaped cross-piece and extending across the other arm thereof; a vertical rod pivotally connecting said transverse cross-bar to the outer lever-arm on said sleeve; and an arm projecting rearwardly from the lower cross-bar of the platen-supporting sliding frame, and terminating in an upward-extending finger for engagement with the said pivoted transverse cross-bar when the platen is raised to its full limit.

11. In a type-writing machine of the class described, the combination with a vertically-arranged horizontally-revolving platen, mounted on a vertical shaft, of a ratchet-wheel fast on said shaft; a lever carrying a stationary dog and a movable dog, at its free end, for engagement with the teeth of said ratchet-wheel, and having a pin projecting laterally over said ratchet-wheel; means for depressing said lever, to permit the free revolution of said platen; a smaller ratchet-wheel resting on the first-named wheel and having an upward-projecting hub loose on the platen-shaft, each ratchet-wheel having an arc-shaped slot therethrough, and each having a projecting pin projecting through the slot in the other ratchet-wheel, and the lower ratchet-wheel having another pin connected by a spring to the pin projecting from the upper ratchet-wheel; and a plate loosely mounted on the hub of the said upper ratchet-wheel, the free end of this plate projecting beyond the periphery of the said upper ratchet-wheel, and carrying a pivoted dog held by a spring against the teeth of the latter.

12. In a type-writing machine of the class described, the combination with a vertically-movable horizontally-revolving platen having independent springs for driving said platen vertically and horizontally, of a margin-regulating key and connecting mechanism for automatically revolving said platen without lateral or vertical change of position of said platen, at each depression of said key.

In testimony that I claim the foregoing I have hereunto set my hand, at New York, in the county of New York and State of New York, in the presence of two witnesses.

EDWARD VICTOR BAILLARD.

Witnesses:
J. M. JOHNSON,
J. J. COKELEY.